July 26, 1955 M. M. GRUBER ET AL 2,714,010

MAGNETIC TRANSDUCING UNIT

Filed July 7, 1948 4 Sheets-Sheet 1

INVENTORS
MORRIS M. GRUBER
GEORGE J. SALIBA
BY James and Franklin
ATTORNEYS

INVENTORS
MORRIS M. GRUBER
GEORGE J. SALIBA
BY James and Franklin
ATTORNEYS

July 26, 1955 M. M. GRUBER ET AL 2,714,010

MAGNETIC TRANSDUCING UNIT

Filed July 7, 1948 4 Sheets-Sheet 3

INVENTORS
MORRIS M. GRUBER
GEORGE J. SALIBA
BY
James and Franklin
ATTORNEYS

INVENTORS
MORRIS M. GRUBER
GEORGE J. SALIBA
BY
James and Franklin
ATTORNEYS

United States Patent Office 2,714,010
Patented July 26, 1955

1 2

2,714,010

MAGNETIC TRANSDUCING UNIT

Morris M. Gruber, New York, N. Y., and George J. Saliba, Englewood, N. J., assignors to Presto Recording Corporation, Paramus, N. J., a corporation of New York Application July 7, 1948, Serial No. 37,324

12 Claims. (Cl. 274—4)

This invention relates to magnetic transducing units, and more particularly to such a unit intended primarily for office dictation and transcription, although it may be used for other purposes.

The primary object of our invention is to generally improve office dictating machines. The machines in most common use employ a rigid wax cylinder. The use of a cylinder has the advantage of constant linear recording speed. However, cylinders are bulky to handle, transport, and store. Wax cylinders are costly, and breakable. They must be shaved for re-use, which is a rather messy job, and requires a special shaving machine. After a number of shavings the cylinder is used up and must be discarded.

More recently attempts have been made to use magnetic transducers for office dictating purposes. Machines using a magnetic tape or wire have the disadvantage that one cannot locate particular parts of the record to indicate corrections or changes. Moreover, the tape is bulky and costly because there is only one line of recording for the full width of the tape. Tape or wire which must be wound on a reel is not convenient to handle or mail.

Magnetic recording on flat circular record has also been suggested. This has the advantage of being flat for filing or mailing, but has the disadvantage of variable linear recording speed, the linear speed being much less at the center than at the outside of the record. Because of the inconvenience of mailing a circular record, a magnetic medium has been proposed which may be folded for mailing, but it is difficult to cause such a record to lie perfectly flat when it is opened out at the destination.

One object of our invention is to overcome the foregoing difficulties and disadvantages, and to provide an office dictating machine in the form of a magnetic transducer which employs a thin flexible rectangular sheet as a recording medium, said sheet preferably being letter-size in dimension. This is wound about a cylindrical drum provided with readily releasable securing means. Such a sheet may be used hundreds of times. It may be filed, or transported in flat condition, or folded like a letter. However, more usually it is simply clipped to a letter being answered until the record is transcribed and replaced by a carbon copy of the answering letter, whereupon the record sheet may be re-used. The erasing operation may form a part of the recording operation. Because the helical lines of recording may be closely spaced, the record is economical. A single letter-size sheet may be used for fifteen minutes of recording, and at a cost only a small fraction of the cost of tape or wire for the same recording time. Compared to a circular record, the sheet is economical because there is no waste in cutting it from larger sheets, and the linear recording speed is constant. Creases or folds are of no consequence, because of the manner in which the sheet is drawn taut about the drum when being mounted on the drum.

Other objects of the invention center about the mechanical construction of the transducing apparatus. One object is to accurately and reproduceably locate the sheet on the drum. Another is to readily releasably clamp the sheet in position. Still another object is to provide a friction drive between a drive motor and the drum, which drive is readily and instantaneously disengaged under remote control. Thus the recording operation may be interrupted between words or phrases at the will of the dictator. Because the motor continues operating at full speed, the record is brought to full recording speed almost instantly when the drive is resumed.

Still further objects are to provide improved lead screw means for moving the magnetic head along the cylindrical drum; to provide a convenient control knob or wheel at the front of the recording head for manually moving the head to one side or the other; to so mount the recording head that it may be raised away from the drum when adding or removing a record sheet; and to provide means for holding the recording head in either raised position away from the drum, or lowered position at the drum.

Still another object is to permit the transducing magnet to touch the record medium for maximum efficiency, yet with such light pressure as not to wear out even a thin paper-like medium after hundreds of recordings. For this purpose the magnet itself is pivotallally mounted on the head for limited movement, and the head when in lowered position comes immediately adjacent but does not rest on the medium. In this way the magnet rests on the medium, but with a bearing pressure limited to its own relatively slight weight, and not including any of the weight of the head.

Still another object is to insure accurate registration between the transducing magnet and the line of recording on the sheet after transfer of the sheet from a dictating machine to a transcribing machine, or for playback on the same machine. For this purpose we provide registration means for slightly axially adjusting the position of the head independently of and without rotation of the lead screw.

In accordance with another feature and object of the present invention, the apparatus supports a paper index strip, and the magnetic head has a pointer cooperating with said index strip. Such a strip may be sent along with each record sheet to indicate corrections or cancellations. While the use of such a strip is not new with a wax cylinder, one important advantage of the present invention is that it makes it possible to employ an index strip with a magnetic recording.

To accomplish the foregoing general objects, and other more specific objects which will hereinafter appear, our invention resides in the magnetic transducer elements and their relation one to another as are hereinafter more particularly described in the following specification. The specification is accompanied by drawings in which Fig. 1 schematically represents a pair of recording and transcribing units;

Figure 1:
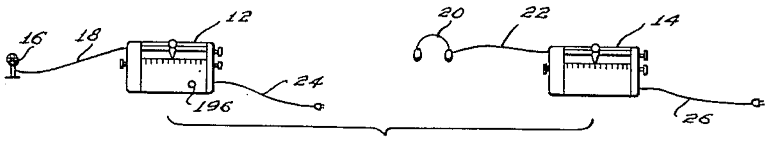

Referring to the drawing, and more particularly to Fig. 1, the recording unit 12 and the transcription unit 14 are substantially the same mechanically. The detailed description which follows will be applied to the recording unit, and the slight differences between the recording unit and the transcribing unit will be pointed out. The recording unit 12 has a microphone 16 connected thereto by means of a flexible cord 18. The transcription unit 14 has a pair of earphones 20 connected thereto by means of a flexible cord 22. Both units have flexible power cords, marked 24 and 26, with a conventional male plug for insertion in a wall outlet. The microphone 16 is preferably of a type which can function also as a speaker for playback. The earphones 20 of the transcription unit may be replaced by a loudspeaker, if preferred.

In appearance, the units 12 and 14 have some resemblance to known office dictating machines using wax cylinders. However, the present machines are markedly different in operation because they are magnetic transducing units. Another important difference is that while the recording is made and is played back in cylindrical form, it is carried by a thin flexible sheet which is rectangular in outline, and which may, if desired, be letter-size in dimension. Such a sheet is shown at 30 in Fig. 5, and it will be noted that in this particular case the sheet is a perfectly plain rectangular sheet except for notches or apertures at 32 which cooperate with locating pins, as will be described later. The sheet 30 may be either a paper sheet, or a plastic sheet made for example of cellulose acetate. Both materials are already used in tape form for tape recorders. The sheet is coated with a suitable ferrous or magnetic material, usually an oxide of iron. The material of the sheet is not in itself a part of the present invention, but the concept of using a thin flexible magnetic sheet in rectangular form, and winding the same about a cylinder, to produce a helical recording thereon, is a basic and important feature of the invention.

Figure 6:
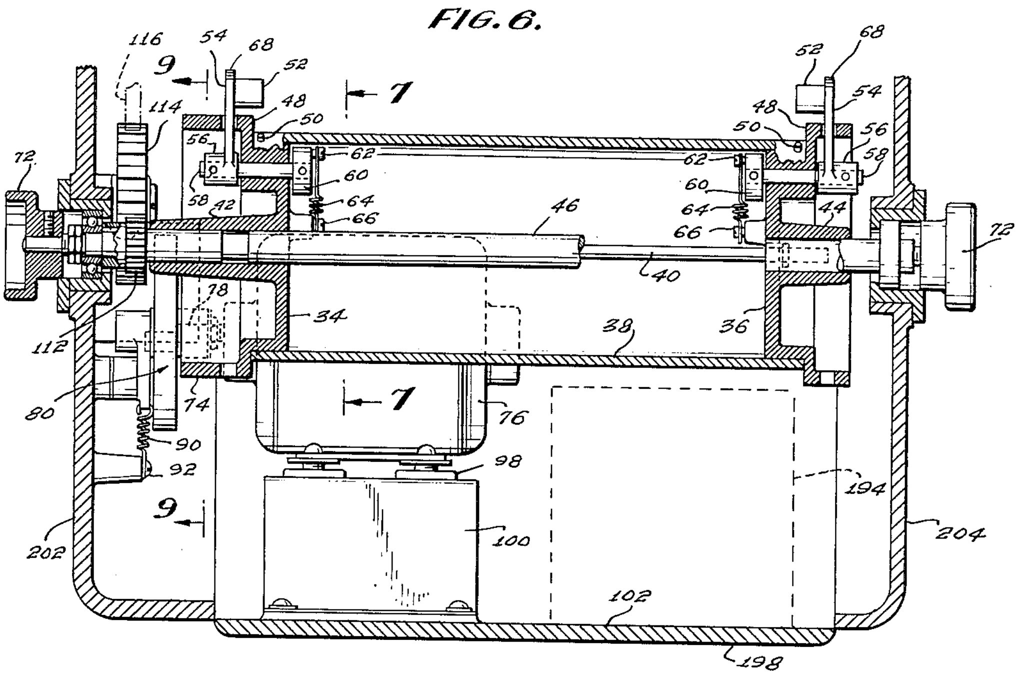
Fig. 6 is a section taken in elevation approximately in the plane of the line 6—6 of Fig. 2.
Figure 7:
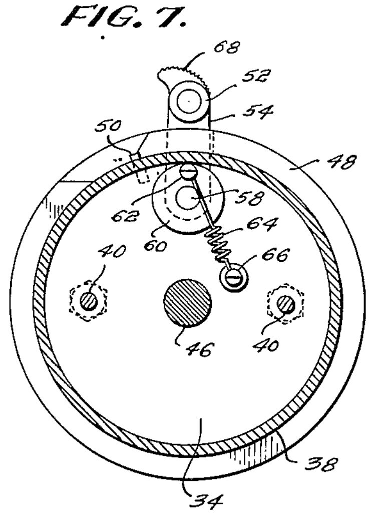
Fig. 7 is a transverse section through the drum taken approximately in the plane of the line 7—7 of Fig. 6.
Figure 8:
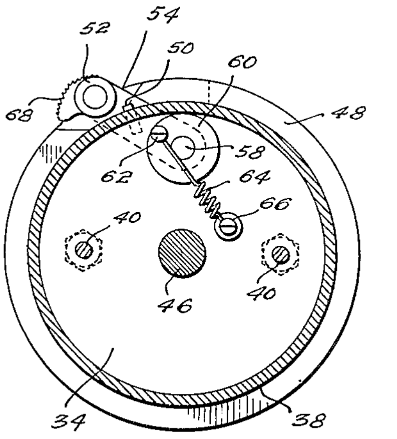
Fig. 8 is a similar view but showing the clamps moved nearly to working position.

The sheet is wound about a drum, the construction of which is best shown in Figs. 6, 7 and 8 of the drawing. The drum comprises ends 34 and 36, with a metal tube 38 secured therebetween. The assembly is held together, in this case by means of a pair of tension rods 40, the ends of which are threaded to receive nuts which pull the ends and tube together. The ends 34 and 36 are provided with hubs 42 and 44 which receive a suitable shaft 46. The hubs are locked on the shaft, by means of set screws, not shown.

The ends 34 and 36 include flanges 48 which have a diameter larger than the diameter of the cylinder. The recording sheet has a width accurately fitting between the flanges 48, thus locating the sheet closely against axial movement. The drum is further provided with a pair of locating pins 50 disposed just inside the flanges 48. The leading edge of the sheet is disposed against the pins 50 as the sheet is wound about the drum. To hold the sheet on the drum, the drum is preferably provided with readily releasable clamp means 52.

In the present case each clamp 52 is a stud carried at one end of a finger 54, the other end of which is enlarged to form a hub 56 which is secured to a pin 58. This pin is held in a bearing formed in the end of the drum, and the inner end of the pin is provided with a crank disc 60, the crank pin 62 of which receives one end of a pull spring 64, the other end of which is anchored inside the end of the drum, as indicated at 66. By comparison of Figs. 7 and 8 it will be seen that the clamp finger may be moved to either the raised position shown in Fig. 7, at which time the spring 64 is on one side of the axis, or a lowered or clamping position which is approached in Fig. 8, at which time the spring is on the other side of the axis. The end of the clamp finger may be roughened or knurled, as is indicated at 68, to facilitate raising or lowering the clamp.

Figure 5:
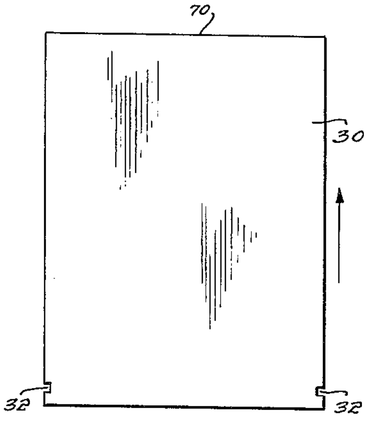
Fig. 5 shows a magnetic record sheet used with the transducer unit.

The sheet may be dimensioned so that its edges will come into abutting relation when wound about the drum. However, we have found that greater dimensional tolerance may be employed, with a minimum of click, if the ends of the sheet are overlapped, and the apparatus here illustrated is used in that fashion. Specifically, the leading edge, in this case the edge 70 in Fig. 5, is placed against the locating pins 50 with the sheet 30 between the side flanges, whereupon the clamp fingers are lowered to hold the leading edge of the sheet. The drum is then rotated by either of the end knobs 72, thus winding the sheet about the drum. As the trailing edge of the sheet comes over the leading edge, the notches 32 (Fig. 5) register with and fit around the locating pins 50. The clamp finger on one side is raised to permit the end of the overlapping portion to fall into position, and then lowered to bear against the overlapped ends. The same is then done with the other clamp finger. The sheet may, of course, be steadied by placing one's hand against the overlapping edges at the middle of the drum while raising and lowering the clamp fingers.

Other arrangements may be used to hold the sheet on the drum, the important thing being to provide means for accurately and reproduceably locating the sheet on the drum, the said means being readily releasable so that little time will be lost in adding or removing a sheet.

The drum is preferably driven by a friction drive system next described. In Fig. 6 it will be noted that the end 34 has a wide rim 74 which acts as a driving wheel. The drum is driven by a motor 76 through a train of friction wheels, best shown in Fig. 9. Referring to that figure, the motor is provided with a pulley 78. This is preferably metal and of small diameter, and may in fact consist of one end of the motor shaft. Pulley 78 drives the wheel 74 by means of an idler 80. In the present case this is a stepped idler consisting of a large diameter wheel 82 and a small diameter wheel or pinion 84. Pulley 78 drives wheel 82 and pinion 84, which in turn drives wheel 74. In practice the pulley 78 and the wheel 74 are preferably made of metal, and idler 80 is either made of, or is provided with a rim made of a yieldable frictional material, typically rubber.

The idler 80 is preferably movably mounted, and for this purpose is rotatably carried at one end of a lever 86 pivoted at 88 and normally urged in one direction by resilient means, in this case a pull spring 90, the lower end 92 of which is fixed on a side wall of the machine, as is best shown in Fig. 6. It will be seen from inspection of Fig. 9 of the drawing that spring 90 urges the idler into driving engagement with the pulley 78 and the wheel 74. The disposition of the centers is such that there is a toggle action, that is, the drive friction is increased compared to the actual pull of the spring.

Figure 9:
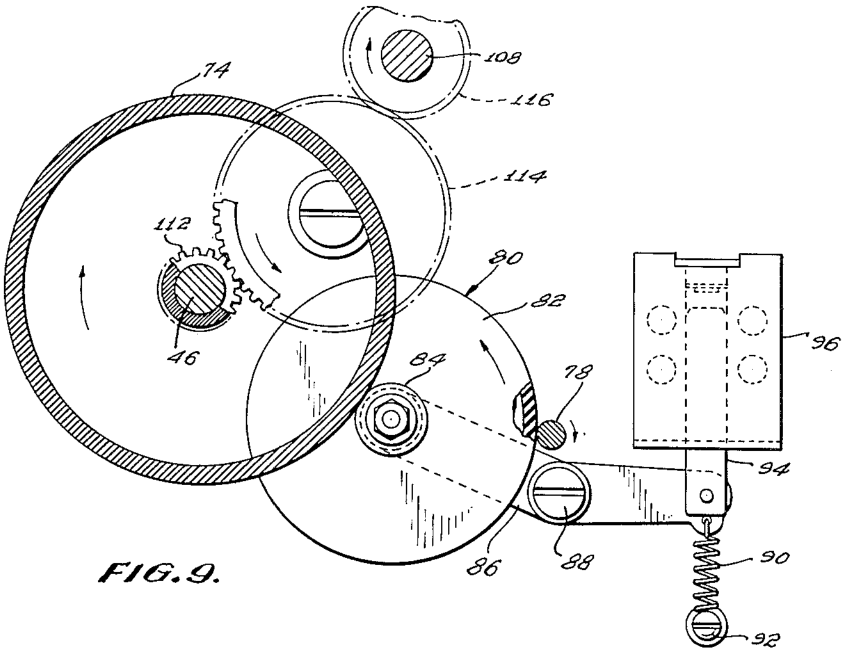
Fig. 9 shows the drive gearing and is a section taken approximately in the plane of the line 9—9 of Fig. 6.

The direction of the arrow in Fig. 9 shows that the drive of the drum is in the same direction that the record sheet is initially wound about the drum. The trailing edge of the sheet therefore overlaps in such a direction as to readily ride past the transducer head without catching or tearing.

The end of lever 86 is connected to the plunger 94 of a solenoid 96. It will be seen that energization of the solenoid pulls the lever against the action of spring 90 and moves the idler 80 downward, thus disengaging the friction drive. The solenoid 96 is energized under the control of a suitable switch, preferably a remote control switch located at the microphone 16 shown in Fig. 1. Thus the rotation of the drum may be interrupted between sentences or phrases. The motor continues running, which is of advantage in order to bring the drum to normal recording speed instantaneously when the dictation is resumed.

Figure 11:
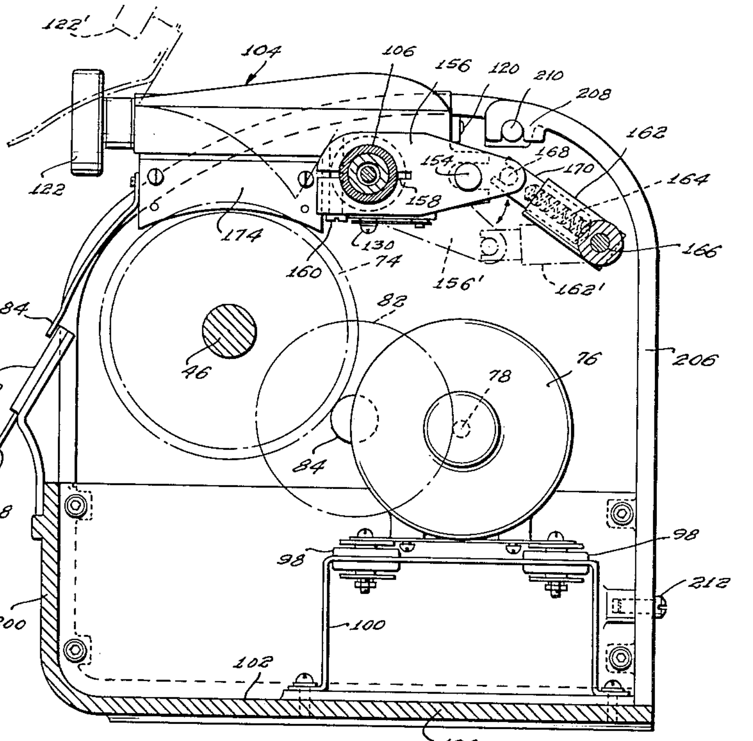
Fig. 11 is a transverse section taken approximately in th plane of the line 11—11 of Fig. 2.

The relation of the friction wheel drive shown in Fig. 9 to the complete machine is best shown in Fig. 11, in which the wheels 78, 82, 84 and 74 all correspond to those shown in Fig. 9. The motor 76 is carried on suitable shock-mounts 98, which in turn are secured to an elevated support 100, the lower edges of which are screwed directly to the base 102 of the machine.

The transducer head or mount is generally designated 104 (Figs. 2, 3 and 4) and is movable along the drum, that is, in axial direction. It may also be manually moved toward or away from the drum, as is shown by the change from the solid line position 104 to the dotted line position 104' in Fig. 4. The head 104 is slidably carried on a smooth tube 106. It is moved along the tube by means of a lead screw 108 which is mounted concentrically within the tube 106, the tube being cut away or slotted on top, as is indicated at 110 in Fig. 2, to provide access to the lead screw 108.

Figure 10:
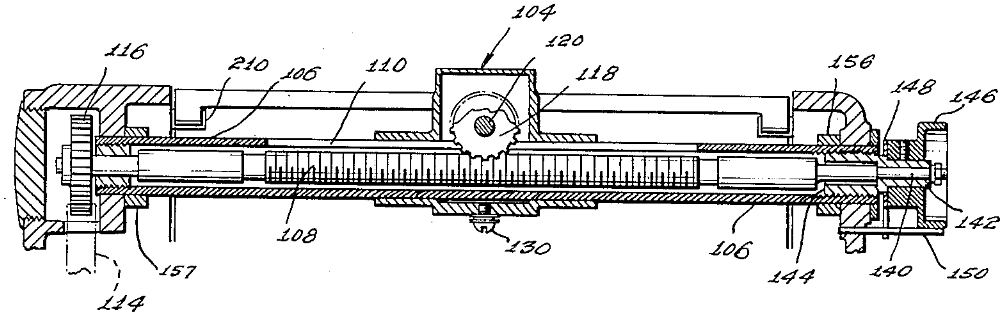
Fig. 10 is a longitudinal section through the lead screw and is taken approximately in the plane of the line 10—10 of Fig. 2.

The drive between the drum and the lead screw is preferably made a positive or gear drive in order to accurately maintain the pitch of the helical recording, so that it will be accurately reproduceable in the transcription unit. The gearing for this purpose is best shown in Fig. 9, in which it will be seen that a pinion 112 secured to the shaft 46 of the drum meshes with an idler gear 114, which in turn meshes with a gear 116 which is secured to one end of the lead screw 108. In Fig. 10 it will be seen that gear 116 may be somewhat narrower than idler 114, thereby accommodating some axial movement of lead screw 108 and gear 116.

The head 104 is provided with means engaging the lead screw 108 and acting as a nut which is moved by the lead screw. In the present case this means is itself a gear wheel 118 (Fig. 10) which is normally locked against rotation. The lowermost teeth of gear 118 mesh with the threads on the lead screw 108. The gear 118 is mounted on a shaft 120 carried by head 104, and the lower part of the gear passes downward through the aforementioned slot 110 at the top of the tube 106 on which the head 104 slides. The gear 118 is preferably cut like a worm gear, thus providing teeth which accurately mesh with the lead screw 108 acting as a worm.

Figure 12:
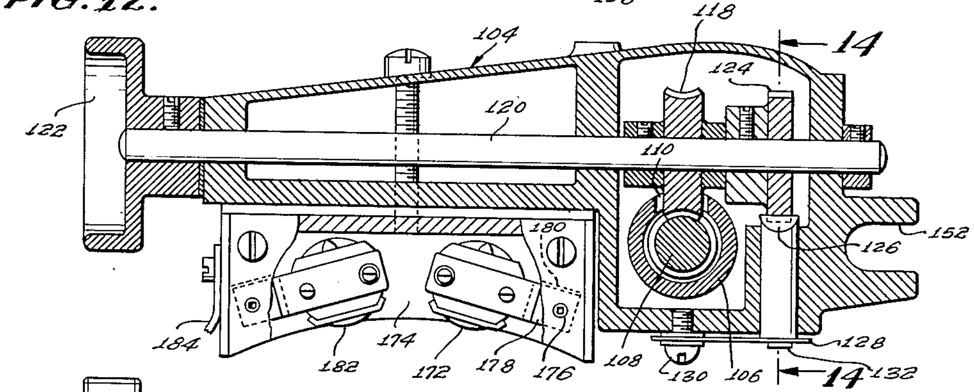
Fig. 12 is a section through the recording head taken approximately in the plane of the line 12—12 of Fig. 2.

The gear 118 may itself be used as a feed wheel for manual feed of the head to any desired position along the drum. Referring now to Fig. 12 of the drawing, it will be seen that shaft 120 passes through head 104 and terminates at the forward end of the head in a knob or hand wheel 122. It will be evident that by rotating the knob 122 the feed wheel 118 is turned, thereby moving the head in one direction or the other relative to the lead screw, and without rotation of the lead screw. In fact the lead screw acts as a stationary rack during manual feed of the head 104.

Figure 14:
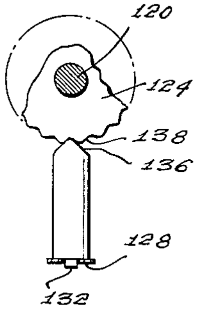
Fig. 14 is an explanatory detail looking approximately in the plane of the line 14—14 of Fig. 12.

To normally hold the gear 118 against rotation, a detent wheel 124 is secured on shaft 120 and cooperates with a detent tooth 126. The detent tooth is normally urged upwardly by means of a leaf spring 128, best shown in Figs. 12 and 13, one end of the leaf spring being fixedly mounted by means of a screw 130 at the bottom of the head, while the other end bears against the bottom of the detent. For simplicity, the detent may be a cylindrical rod slidable in a hole, but in such case it is preferably provided with a rectangular tenon 132 at its lower end, the said tenon being received in a rectangular slot 134 in spring 128, in order to hold the detent against rotation. The action of the detent will be clear from inspection of Fig. 14, in which it will be seen that the relatively blunt wedge-like upper end 136 of the detent cooperates with correspondingly blunt detent teeth 138, the detent being urged upwardly by leaf spring 128. The shape of the detent teeth is such as not to prevent manual feed of the head. There is some resistance to rotation of the manual feed knob, and the clicks of the detent as the knob is turned may themselves be used as a measure of the distance that the head has been moved. However, the detent action is adequate to lock the feed gear 118 during normal feed of the head by means of the lead screw 108.

As so far described, it is assumed that the magnet will be in registration with the record line on the sheet after removal and transfer of the sheet to the transcription machine, and in most cases such will be the case because of the precautions taken for proper location of the sheet on the drum. The feed gear 118 is at no time disengaged from the lead screw, and unless the number of teeth on the detent wheel bear some odd and irrational relation to the number of teeth on the feed gear, instead of being equal or related by a simple whole number, as is preferably the case, there is no reason to anticipate a loss of registration. However, for economy it is desirable to space the magnetic record lines closely, yet for convenience it is not good to limit too closely the tolerance between the sheet dimension and the drum receiving the same. For these and other reasons it is desirable to provide means to assure accurate registration between the magnet and the record line with which it cooperates. For this purpose we provide means which affords a slight adjustment of the head, independently of rotation of the lead screw. In the particular apparatus here shown we produce the desired adjustment by a bodily movement of the entire lead screw 108 and with it, of course, the feed gear 118 and head 104. Such an adjustment is preferably controlled with the aid of a screw, because of the minute change required.

Referring now to Fig. 10 of the drawing, the end 140 of lead screw 108 is rotatably carried in a bushing 142. The lead screw is, however, held against axial movement relative to the bushing. The bushing is itself threaded on the outer surface of its inner end 144, the said thread mating with a thread on the inside of the guide tube 106. The outer end of bushing 142 carries a knob or hand wheel 146. The tube 106 is so mounted in the machine that it is held against axial movement. It will therefore be evident that rotation of knob 146 turns the bushing, and consequently moves the lead screw in axial direction, but without rotating the lead screw, the latter being held against rotation by the gearing 114, 116, etc. In this way the head may be moved back or forth independently of the lead screw in order to establish proper registration between the magnet and the record line. Such registration is readily determined by the listener because the speech is most clear and loud when proper registration is obtained, whereas it becomes fuzzy as the magnet moves off the record line slightly, and is entirely blurred when the magnet is moved so far as to rest equi-distantly between two record lines.

Of course, the amount of adjustment needed is very slight, it amounting to only one-half the pitch of the record lines to either side, as a maximum. For this reason the rotation of knob 146 is preferably limited, and reverting to Figs. 3 and 4 of the drawing, it will be seen that the knob 146 is provided with a stop plate 148 having spaced stop arms which cooperate with a stationary stop pin 150. In the particular case here shown, the stop plate 148 affords about one-quarter revolution of the knob 146, which provides an adequate range of adjustment. To hold the knob in adjusted position, it preferably cooperates with a spring detent finger. In the present case the stop pin 150 is extended and rubs against the knob. The periphery of the knob is serrated or knurled, and so is readily held by the spring finger.

Figure 2:
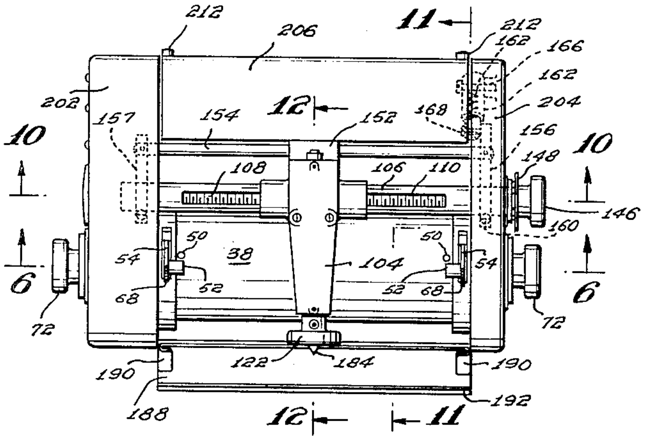
Fig. 2 is a plan view of a unit.

It has already been mentioned that the head 104 may be raised or lowered. It will be evident that for this purpose it may turn about the axis of the guide tube 106. However, it is desirable to provide additional means to hold the head in either raised or lowered position, and also to accurately control its movement. For this purpose we provide an additional guide rod behind the guide tube 106, and we further provide spring toggle mechanism to control the position of said guide rod. Referring to Fig. 12 of the drawing, it will be seen that the rear end of head 104 is provided with a guide channel or yoke 152. In Fig. 2 it will be observed that the part 152 slidably encompasses a guide rod 154. Referring now to Figs. 2 and 11, it will be seen that one end of guide rod 154 is carried in an arm 156 which is fixedly secured to one end of the guide tube 106. More specifically, the arm 156 is split at 158 and clamped securely about the tube, as by means of a screw 160. At the other end of the machine there is another arm 157 (Fig. 2) clamped on tube 106 and carrying the other end of the guide rod 154. Thus the tube 106, the arms 156 and 157, and the rod 154 may be oscillated in unison in downward or upward direction, corresponding to the change between the solid line position 156 in Fig. 11 and the broken line position 156', the manual feed knob changing at the same time from the solid line position 122 to the broken line position 122'.

Appropriate means may be provided to hold the head in either raised or lowered position. In the present case this comprises a telescopic arm 162 (Figs. 2 and 11) normally expanded by means of a compression spring 164 (Fig. 11), the said arm being oscillatably mounted on a stationary pin 166, and its other end being connected at 168 to the arm 156 previously referred to. It will be evident from inspection of Fig. 11 that in the solid line position the arms 156, 162 are on one side of dead center, and in the broken line position the arms 156', 162' are on the other side of dead center. In moving toward the dead center position, part 170 of telescopic arm 162 is slid inwardly, thereby compressing the spring 164. The spring arrangement therefore urges the head to either raised or lowered position, and those positions are limited by stops provided by bearing of the arms 156 or/and 157 against parts of the housing of the machine. The head is raised when applying or removing a record sheet, and is lowered during operation of the machine.

For the sake of maximum efficiency of the magnetic circuit, we prefer to permit the magnet or transducer to contact the sheet. However, the contact pressure is preferably minimized in order not to appreciably wear away the sheet. We have found that this may be done by positively arresting downward movement of the head at a point which spaces the same from the sheet, but at the same time pivotally mounting the relatively tiny magnet itself with a range of movement toward or away from the cylinder such that the magnet may rest on the sheet.

Figure 13:
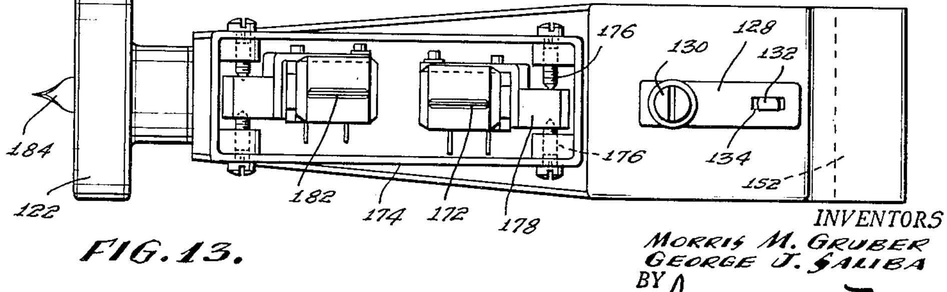
Fig. 13 is a bottom view of the recording head.

Referring to Figs. 12 and 13 of the drawing, the pole of the recording magnet is indicated at 172. The magnet may be conventional, and forms no part of the present invention. The magnet is received in an inverted box or housing 174, and is mounted therein by means of the pointed ends of a pair of fulcrum screws 176. These are adjusted to permit the magnet to move up or down relative to the housing 174, with no appreciable frictional resistance. The amount of movement is, of course, limited by the relation between the support arm 178 carrying the magnet and the surface 180 of the housing.

In the case of the transcription unit only one magnet is required, this being a pick-up magnet. In the case of the recording unit the head is preferably provided with an additional magnet 182, this being an erasing magnet. In external and physical characteristics it is like the magnet 172, and is similarly mounted on fulcrum pins for limited free movement in a vertical direction. The magnets may be spaced apart a very slight amount in axial direction corresponding, for example, to one record line. The idea, of course, is that both magnets should be in registration at the same time. The displacement might be a substantial number of record lines, but for a reason later pointed out, it is convenient to erase immediately ahead of recording, although this is not at all essential. The fulcrum screws 176 previously referred to, and the corresponding fulcrum screws for the erasing magnet, make it possible to slightly adjust either magnet or both in an axial direction, and thus help establish the precise spacing between the magnets.

The erasing magnet may be energized in accordance with any of the known and accepted procedures. One method is to provide a small high frequency oscillator as a part of the electrical equipment, said oscillator providing the erasing magnet with high frequency current. Another system is to employ a rectifier, filter and D. C. current.

Figure 3:
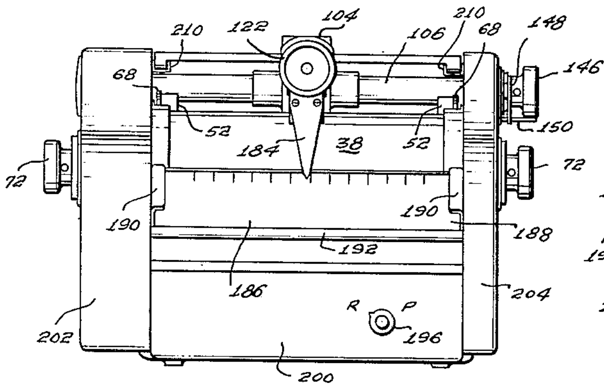
Fig. 3 is a front elevation of the same.
Figure 4:
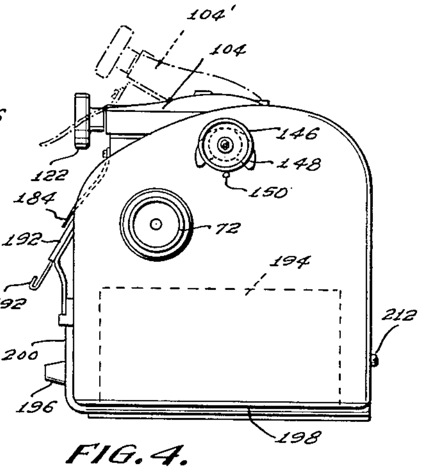
Fig. 4 is an end elevation of the same.

The head 104, and more particularly the magnet housing 174, is preferably provided with a pointer 184, best shown in Fig. 3 of the drawing. This pointer cooperates with a paper index slip 186 which is releasably slid into a holder 188. The holder has end flanges 190 and a bottom flange 192. The index slip is preferably printed with scale graduations corresponding in spacing to the record lines. Such a slip may be arranged and used in a manner already in vogue with office dictating machines of the wax cylinder type. Although the use of such an index slip is not in itself new, it is one important advantage of our magnetic recording that it is readily combined with an index slip.

The amplifier may be of conventional type, and its details form no part of the present invention. It preferably employs miniature tubes, and therefore may be made compact enough to readily fit inside the machine, resting on the bottom of the machine alongside the motor, as is indicated by the broken line rectangle 194 in Figs. 4 and 6. A switch is preferably provided, controlled by a suitable knob such as that indicated at 196 in Figs. 1, 3 and 4, for reversing the connections to the amplifier. In other words, during recording the microphone is connected to the input end of the amplifier, the output end being connected to the recording magnet. However, during play back the switch 196 is turned from a recording position to a play back position, thus connecting the magnet to the input end of the amplifier, and the microphone, then acting as a speaker, to the output end of the amplifier. Such a switch is not needed in the transcription unit, unless the recording unit is used also as a transcription unit.

The casing of the instrument is in the present instance made up of four main parts which are preferably molded, and which may be die castings. One main member is a bottom 198 best shown in Figs. 6 and 11, the said bottom preferably including a front wall 200 (Fig. 11). Then there are end walls 202 and 204. These are not merely flat walls, but rather are housings which, however, are open on their inner faces. The end 202 has bearings for, and encloses, substantially all of the drive mechanism of the apparatus other than the motor itself. In other words, it carries the friction wheel drive train for the drum, and the gear train for the lead screw. The end section 204 is narrower, and carries the knob and threaded bushing for registration or adjustment of the lead screw. It also carries the toggle mechanism for holding the head in raised or lowered position. The ends 202 and 204 also provide bearings for the drum and for the lead screw.

The bottom section carries the motor and the amplifier. The end sections are secured to the bottom section by appropriate socket head cap screws (see Fig. 11). The fourth main section is a cover plate 206 (Figs. 2 and 11) for the back of the instrument. As is best shown in Fig. 11, this curves forwardly at the top and therefore covers a part of the top of the instrument. The mechanism of the instrument will function without the back plate 206, and the latter is made readily removable for servicing or the like. For this purpose it is provided with ears 208 at the top which fit over pins 210. The lower end of the back plate is held in position by screws 212.

By way of illustration, and not in limitation of the invention, it may be mentioned that in one particular type of apparatus embodying our invention the recording is made at 40 lines per inch. Thus the pitch between record lines is 25 mils. The width of the record line is 15 mils, leaving a spacing of 10 mils between record lines. A recording speed of 5½ inches per second is adequate for clear speech. At this recording speed a single letter-size sheet will provide a fifteen minute record. Such a record, if provided on tape, would require so long a tape that the cost would be some twenty times the cost of the present record sheet.

Of course, for the recording of music a higher recording speed is desirable, say, seven inches per second for ordinary reproduction, and a still higher speed for high fidelity or best quality music. This has to do with the frequency range, higher frequencies requiring a greater linear recording speed.

One type of magnetic record sheet which has been employed successfully is that made by the Minnesota Mining and Manufacturing Company of St. Paul, Minnesota, and another is that made by The Brush Development Company of Cleveland, Ohio. Sheets with both a paper base, and a plastic base such as cellulose acetate, have been successfully employed. Despite the contact between the magnet and the sheet we have found no appreciable deterioration in the record even after erasing and re-using the sheet five hundred times.

It is believed that the method of making and using our improved magnetic transducing apparatus, as well as the advantages of the same, will be apparent from the foregoing detailed description. A record sheet is applied to the drum, the knob on either end of the drum being used for rotation when applying the sheet. The forward edge is held by the clamps until the trailing edge is reached, whereupon the same clamps are used to hold both the trailing and leading edges, which, in the form here shown, overlap. The cylinder is preferably made of a non-magnetic material. The manual feed knob on the head is rotated to move the head to the starting end of the record.

With the motor started, a switch button on the microphone is employed to engage or disengage the friction gear drive, thus starting or stopping the drum. An old recording is erased as the dictation proceeds. If the dictator changes his mind about the last portion of his dictation, he can readily turn the recording head back, the distance being gauged by the clicks of the detent wheel, or by observation of the pointer on the index slip. Dictation may be resumed after one rotation to insure erasure.

If the dictator wishes to play back part or all of the record he has merely to turn the head back to desired position and to then turn a switch from recording to playback position. This switch includes means to cut out or de-energize the erasing magnet. The latter is effective during recording but not during playback. If minor corrections or changes are noticed during playback, they may be indicated on the index slip at the appropriate points. Detailed instruction for such changes may be dictated at a later point at the end of the particular recording or section of recording being listened to. Otherwise the faulty section may be redictated, as indicated above.

After completion of a record sheet the head is raised and the sheet is removed from the drum. In some cases the back of the sheet is adapted to be written upon for identification. In other cases a special blank edge may be provided at the leading edge of the sheet where it is overlapped by the trailing edge, and identification may be written on this edge portion. In any event the sheet, even without identification, may be clipped to a letter being answered, or placed in a file being worked with, until the answering letter or the memorandum has been transcribed. In many cases the convenient transportability of the sheet is of advantage. For example, a man having a recording unit at home can bring the product of his work to the office in an ordinary flat briefcase or folder. In fact, the sheets may be folded, either for mailing, or to be carried in one's pocket. The fold lines are of no consequence because the sheet is drawn taut when it is wound about the drum for transcription.

In any case the sheet is then placed in the transcription machine and is played back to the typist, usually through earphones, although a speaker may be used if desired. It is not essential to use a special transcription machine, and the regular recording machine may be used also for transcription, it then being used in the playback condition. After the dictation has been transcribed in writing, the magnetic sheet may be returned for re-use. In particularly important work the magnetic sheet may be left in the file as an original record, or be left in the file temporarily until appropriate proof-reading has been undertaken. The entire system is particularly convenient because of the nature of the record, it being a thin flexible sheet which in flexibility, lightness and dimension is much like an ordinary sheet of paper, and therefore may be handled, stored or transported with far greater convenience than bulky cylindrical records.

It will be understood that an erasing magnet may be provided on either the recording machine or the transcribing machine, or both. In fact it may be omitted from both, and a special machine may be provided with a drum and erasing magnet for the sole purpose of erasing. Appropriate switching may be provided on either machine to make the erasing operation a separate operation, the erasing magnet being used entirely through the record, instead of being used just ahead of a recording magnet in the recording machine, or just behind a reproducing magnet in the transcription machine. However, we believe the arrangement here described is most convenient, that is, the use of an erasing magnet ahead of the recording magnet in order to insure recording on a blank sheet, while at the same time the erasing magnet is omitted from the transcription machine in order to guard against premature erasure of a record which may later be wanted for comparison or proofreading or the like.

The erasing magnet may be a permanent magnet, but we prefer to employ an electro-magnet in order to make the same optionally useable. The erasing magnet is made inoperative during play back on the recording machine, and with a permanent magnet it would be necessary to arrange to move it out of the way, whereas with an electro-magnet a change of switch position is sufficient, and this change may be made to accompany other switching for play back. The erasing magnet may have a wide face to erase a number of lines at a time, but we prefer to employ a narrow face in order to make possible spot erasure of a small part of the record when desired. For this same reason the erasing magnet is preferably located close to the recording magnet instead of a substantial number of lines ahead of the recording magnet. In fact it may be on the same line, instead of being one line ahead, as here shown. The drum is of non-magnetic material, such as brass, if made of metal, or "Bakelite" if made of a synthetic resin or plastic.

It will be understood that some of the mechanical features of the invention centering about the drive of the drum and the lead screw, and the manual feed, and the registration system, etc., may be of value with a cylindrical record which remains in cylindrical form instead of being unrolled as a flat sheet. Such a cylindrical record is described in our co-pending application, Serial No. 49,438, filed September 15, 1948, now Patent No. 2,683,038, issued July 6, 1954.

It will therefore be apparent that while we have shown and described our invention in a preferred form, changes may be made without departing from the spirit of the invention as sought to be described in the following claims.

We claim:

1. A lead screw system for a magnetic transducer apparatus comprising a cylindrical magnetic record medium, a magnetic head, a lead screw extending collaterially of the cylinder for moving the head along the cylinder, means to drive said cylinder and said lead screw, means on said head engaging said lead screw, said head being oscillatable about said lead screw to raise or lower the same relative to the cylinder, arms at the ends of said apparatus oscillatable about the axis of the lead screw, a rod extending rigidly between said arms and offset from said lead screw, means on said head slidably encompassing the rod, and means for controlling the position of said rod and consequently for positively raising or lowering said head.

2. A lead screw system for a magnetic transducer comprising a drum, with means to releasably hold a rectangular magnetic record medium therearound in cylindrical shape, a magnetic head, a lead screw extending collaterally of the drum for moving the head along the drum, gearing between said drum and said lead screw, means on said head engaging said lead screw, said head being oscillatable about said lead screw to raise or lower the same relative to the drum, arms at the ends of said apparatus oscillatable about the axis of the lead screw, a rod extending rigidly between said arms, means on said head slidably encompassing the rod, and toggle means including a compression spring for urging said rod to one position or another, corresponding to a position of said head either adjacent or moved away from said drum.

3. A lead screw system for a magnetic transducer comprising a cylindrical magnetic record medium, a magnetic head, a lead screw extending collaterally of the cylinder for moving the head along the cylinder, drive means for said cylinder and said lead screw, a gear wheel on said head engaging said screw, detent means for normally holding said gear wheel against rotation whereby said wheel acts as a nut which moves the head axially in response to rotation of the screw, and a knob operatively connected to said gear wheel to rotate said gear wheel, whereby manual rotation of the knob positively causes movement of the head.

4. A lead screw system for a magnetic transducer comprising a drum, with means to hold a rectangular magnetic record medium therearound in cylindrical shape, a magnetic head, a lead screw extending collaterally of the drum for moving the head along the drum, gearing between said drum and said lead screw, a gear wheel on said head engaging said screw, detent means for normally holding said gear wheel against rotation whereby said wheel acts as a nut which moves the head axially in response to rotation of the screw, a knob operatively connected to said gear wheel to rotate said gear wheel, whereby manual rotation of the knob positively causes movement of the head, said detent means including a detent wheel and a detent tooth frictionally engaging the same, the engagement being such that it may be overcome by manual rotation of the knob.

5. A lead screw system for a magnetic transducer comprising a drum, with means to hold a rectangular magnetic record medium therearound in cylindrical shape, a magnetic head, a lead screw extending collaterally of the drum for moving the head axially of the drum, gearing between said drum and said lead screw, means on said head engaging said lead screw, and registration means for slightly axially adjusting the position of the lead screw independently of rotation of same, said means including a threaded bushing relative to which the lead screw is rotatable but not movable in axial direction, a mating threaded stationary part of the apparatus receiving said threaded bushing, and an adjusting handle for rotating said bushing a limited amount in one direction or the other in order to give the lead screw and with it the recording head a limited axial movement in one direction or the other.

6. A magnetic transducer comprising a cylindrical magnetic record medium, a transducer mount, said mount being hollow and enclosed except at the bottom, and the side edges at the bottom being concave to better conform to the convex cylinder, said mount being so mounted that it may be raised to a position away from the cylinder or may be lowered to a position immediately adjacent but not resting on said cylinder, a transducer carried within said mount, said transducer being pivotally mounted within the mount for limited movement toward or away from the cylinder but not laterally of the record, whereby the transducer rests on the cylinder with a gravitational bearing pressure limited to its own relatively slight weight and not including the weight of the mount.

7. A magnetic transducer comprising a drum, with means to releasably hold a rectangular magnetic record medium therearound in cylindrical shape, a magnetic head, said head being hollow and enclosed except at the bottom, and the side edges at the bottom being concave to better conform to the convex cylinder, said head being so mounted that it may be raised to a position away from the drum or may be lowered to a position immediately adjacent but not resting on said drum, a magnet carried within said head, said magnet being pivotally mounted within the head for limited movement, whereby the magnet rests on the magnetic medium with a gravitational bearing pressure limited to its own relatively slight weight and not including the weight of the head.

8. A magnetic transducer comprising a cylindrical magnetic record medium, a transducer mount, said mount being hollow and enclosed except at the bottom, and the side edges at the bottom being concave to better conform to the convex cylinder, a lead screw extending collaterally of the cylinder for moving the mount along the cylinder, means to drive said cylinder and said lead screw, means on said mount engaging said lead screw, said mount being so mounted that it may be raised to a position away from the cylinder or may be lowered to a position immediately adjacent but not resting on said cylinder, a transducer carried within said mount, said transducer being pivotally mounted within the mount for limited movement toward or away from the cylinder but not laterally of the record, whereby the transducer rests on the cylinder with a gravitational bearing pressure limited to its own relatively slight weight, and not including the weight of the mount.

9. A magnetic transducer comprising a drum, with means to hold a rectangular magnetic record medium therearound in cylindrical shape, a magnetic head, a lead screw extending collaterally of the drum for moving the head along the drum, gearing between said drum and said lead screw, means on said head engaging said lead screw, said head being so mounted that it may be raised to a position away from the drum or may be lowered to a position immediately adjacent but not resting on said drum, a transducing magnet and an erasing magnet carried by said head in end to end relation transversely of the drum axis, said magnets being pivotally mounted at opposite ends of the head with the magnets between the pivots for limited movement, whereby the magnets rest on the magnetic medium with a gravitational bearing pressure limited to their own relatively slight weight and not including the weight of the head.

10. Transducing apparatus comprising a drum dimensioned to releasably receive a rectangular flexible magnetic sheet therearound, the length of the sheet being greater than the circumference of the drum, so that the ends of the sheet overlap, stationary stop means on said drum near the ends of said drum for accurately and reproduceably locating the starting edge of the sheet on the drum, said stops being spaced apart an amount less than the width of the sheet in order to engage the starting edge of the sheet, clamp means at the ends of said drum for readily releasably holding both ends of the sheet against the drum, the surface of the drum between said locating means and between said clamp means at the ends of the drum being smooth and clear, a magnetic transducing head, means for rotating said drum relative to said head, and means for relatively moving said head and drum axially.

11. Transducing apparatus comprising a drum dimensioned to receive a rectangular flexible magnetic sheet therearound, the length of the sheet being greater than the circumference of the drum, so that the ends of the sheet overlap, flanges near the ends of said drum between which flanges the sheet is accurately received, stationary stop means on said drum near said flanges for accurately and reproduceably locating the starting edge of the sheet on the drum, said stops being spaced apart an amount less than the width of the sheet in order to engage the starting edge of the sheet, clamp means at said flanges for readily releasably holding both ends of the sheet against the drum, the surface of the drum being smooth and clear between said flanges except for said locating and clamp means immediately at said flanges, a magnetic transducing head, means for rotating said drum relative to said head, and means for relatively moving said head and drum axially.

12. A lead screw system for a magnetic transducer comprising a cylindrical magnetic record medium, a magnetic head, a lead screw extending collaterally of the cylinder for moving the head along the cylinder, means to drive both said cylinder and said lead screw in order to cause the head to follow a helical track on the cylinder, means on said head engaging said lead screw, said head being oscillatable about said lead screw for movement toward or away from the cylinder, and toggle means including two arms one of which oscillates with said head and one of which is telescopic, said arms being pivotally connected end to end, a compression spring on said telescopic arm seeking elongation of the same in order to keep the arms on one side or the other of dead center alignment and thereby urging said head to one angular relation or another about said lead screw as an axis, corresponding to a position of said head either adjacent or moved away from said cylinder.

References Cited in the file of this patent

UNITED STATES PATENTS

| | | |
|---|---|---|
| 341,288 | Tainter | May 4, 1886 |
| 446,927 | Richards | Feb. 24, 1891 |
| 774,100 | Noyes | Nov. 1, 1904 |
| 810,209 | Keel | Jan. 16, 1906 |
| 819,670 | Pedersen | May 1, 1906 |
| 849,086 | Rosenfield | Apr. 2, 1907 |
| 898,283 | Stuart | Sept. 8, 1908 |
| 997,427 | Tomlinson | July 11, 1911 |
| 1,651,056 | Goldsborough | Nov. 29, 1927 |
| 1,870,421 | Prout | Aug. 9, 1932 |
| 1,949,840 | Languepin | Mar. 6, 1934 |
| 1,979,829 | Gramann | Nov. 6, 1934 |
| 2,030,638 | Johnson | Feb. 11, 1936 |
| 2,043,884 | Crudo | June 9, 1936 |
| 2,049,169 | Finch | July 28, 1936 |
| 2,082,353 | Proctor | June 1, 1937 |
| 2,110,223 | Harris | Mar. 8, 1938 |
| 2,137,157 | Crudo et al. | Nov. 15, 1938 |
| 2,229,293 | Huntley et al. | Jan. 21, 1941 |
| 2,237,738 | Kuhlik | Apr. 8, 1941 |
| 2,239,359 | Banning | Apr. 22, 1941 |
| 2,246,130 | Forstrom | June 17, 1941 |
| 2,251,603 | Schiff | Aug. 5, 1941 |
| 2,255,339 | Thompson | Sept. 9, 1941 |
| 2,258,106 | Bryce | Oct. 7, 1941 |
| 2,268,645 | Dann | Jan. 6, 1942 |
| 2,323,066 | May | June 29, 1943 |
| 2,455,466 | Brubaker | Dec. 7, 1948 |
| 2,513,441 | Allen | July 4, 1950 |
| 2,530,029 | Pond | Nov. 14, 1950 |
| 2,535,497 | Jones | Dec. 26, 1950 |
| 2,568,869 | Rieber | Sept. 25, 1951 |
| 2,581,499 | Roberts | Jan. 8, 1952 |
| 2,653,819 | Roberts | Sept. 29, 1953 |

FOREIGN PATENTS

| | | |
|---|---|---|
| 611,840 | France | July 19, 1926 |
| 783,581 | France | July 16, 1935 |
| 441,437 | Great Britain | Jan. 20, 1936 |